United States Patent
Anstee

(10) Patent No.: US 7,472,461 B2
(45) Date of Patent: Jan. 6, 2009

(54) LOCKABLE COUPLING HOOK

(76) Inventor: Edward David Anstee, 11 Callantina Road, Hawthorn, Victoria (AU) 3122

( * ) Notice: Subject to any disclaimer, the term of this patent is extended or adjusted under 35 U.S.C. 154(b) by 177 days.

(21) Appl. No.: 10/595,887

(22) PCT Filed: Dec. 1, 2004

(86) PCT No.: PCT/AU2004/001685

§ 371 (c)(1),
(2), (4) Date: May 18, 2006

(87) PCT Pub. No.: WO2005/054711

PCT Pub. Date: Jun. 16, 2005

(65) Prior Publication Data

US 2007/0137008 A1 Jun. 21, 2007

(30) Foreign Application Priority Data

Dec. 1, 2003 (AU) ............................... 2003906657

(51) Int. Cl.
*F16B 45/04* (2006.01)
(52) U.S. Cl. .................................................. 24/600.8
(58) Field of Classification Search ..... 24/600.4–600.8; 294/82.23
See application file for complete search history.

(56) References Cited

U.S. PATENT DOCUMENTS

| 275,537 | A | * | 4/1883 | Straw | 24/600.8 |
|---|---|---|---|---|---|
| 553,137 | A | * | 1/1896 | Shaw | 24/600.7 |
| 633,099 | A | | 9/1899 | Miller | |
| 674,383 | A | | 5/1901 | Jewell | |
| 701,586 | A | * | 6/1902 | Levitt | 24/600.7 |
| 709,572 | A | | 9/1902 | Cowan | |
| 1,234,781 | A | | 7/1917 | Lozier | |
| 1,353,026 | A | | 9/1920 | Clare | |
| 1,521,387 | A | * | 12/1924 | Pericle | 24/600.7 |
| 1,523,765 | A | | 1/1925 | Gilchrist | |
| 1,729,188 | A | | 9/1929 | Schillinger | |
| 4,372,016 | A | * | 2/1983 | LaViolette et al. | 24/600.7 |

* cited by examiner

*Primary Examiner*—James R Brittain
(74) *Attorney, Agent, or Firm*—McKee, Voorhees & Sease, P.L.C.

(57) ABSTRACT

A coupling member (20) includes cylindrical body (22) and hook (24). Sleeve (70) slides over the outer surface of body (22) between and open position (as shown) and a closed position and carries pin (50) which is guided by slots (60, 62) formed in body (22). Closure shaft (30) is mounted within body (22) and biased by spring (42) towards a closed position wherein end (32) of shaft (30) is received within recess (44) formed in portion (26) of hook (24). Pin (50) is slidably mounted in transverse bore (56) of shaft (30). Spring (58) biases pin head (52) towards shaft (30) so that when shaft (30) is in the closed position, pin head (52) is seated in recess (66) and shaft (30) is thereby locked in the closed position. Coupling member (20) can be used for securing lines in mountaineering or cave diving.

13 Claims, 6 Drawing Sheets

PRIOR ART

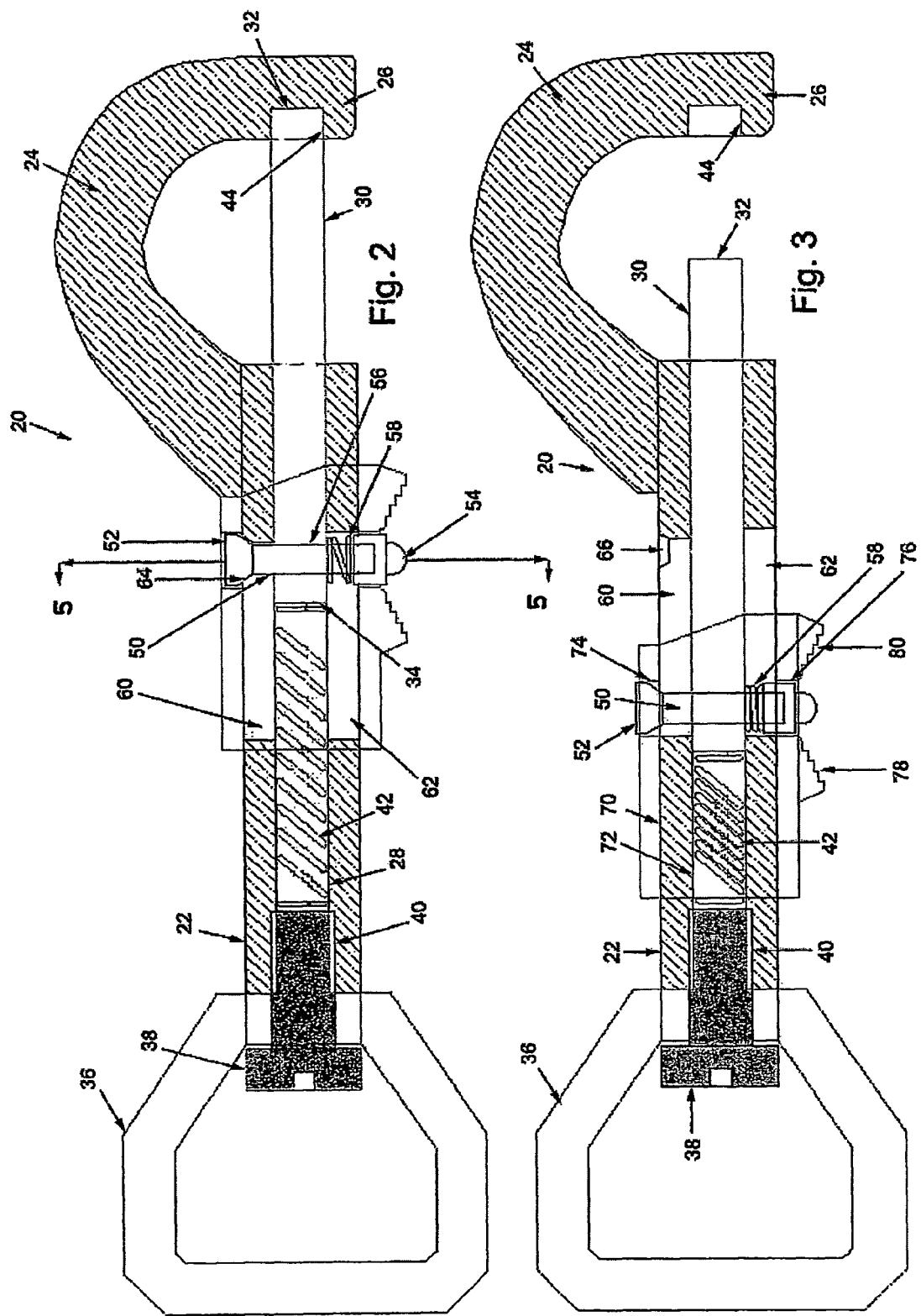

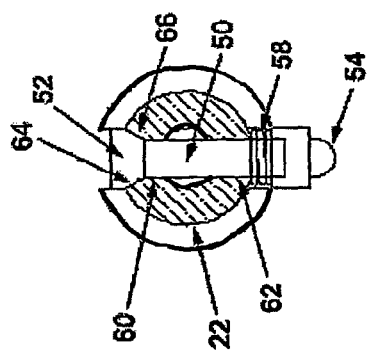
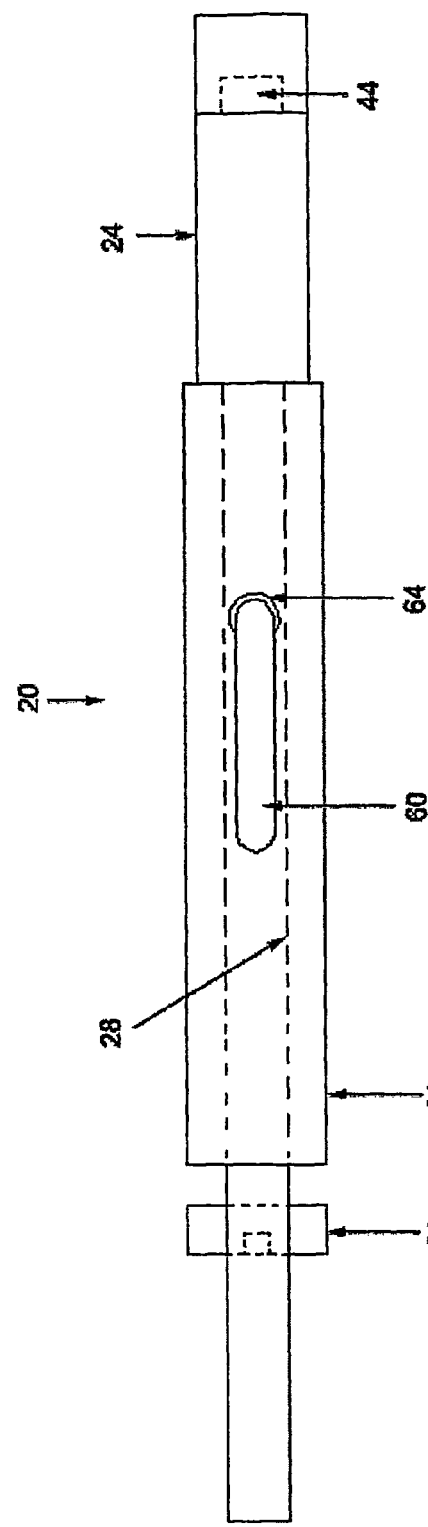

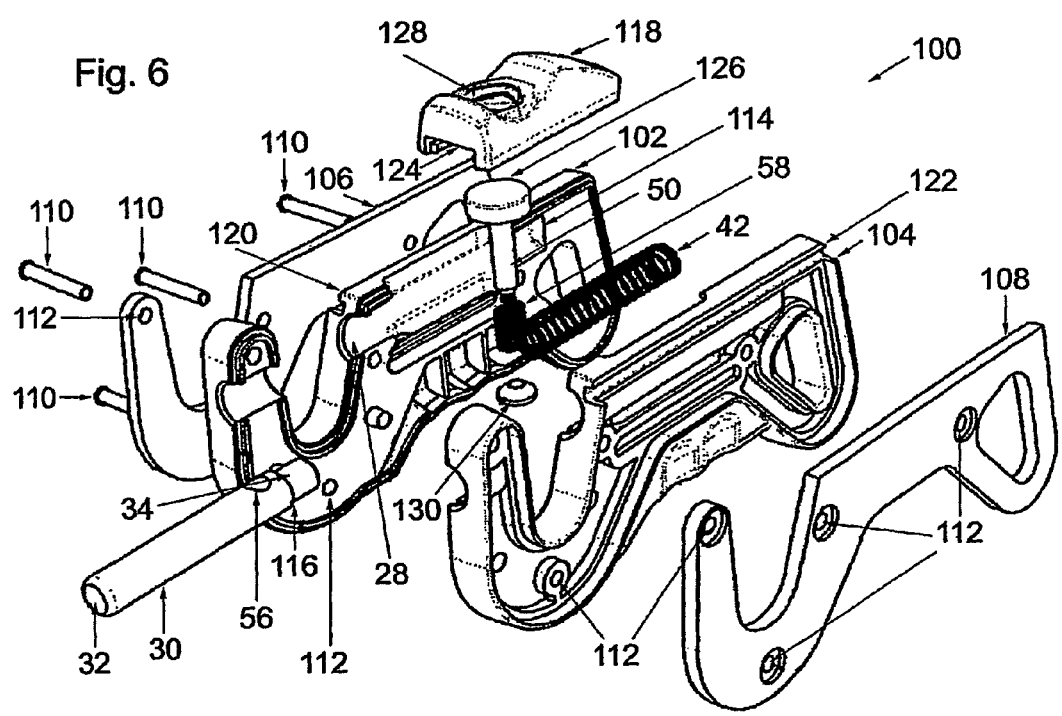

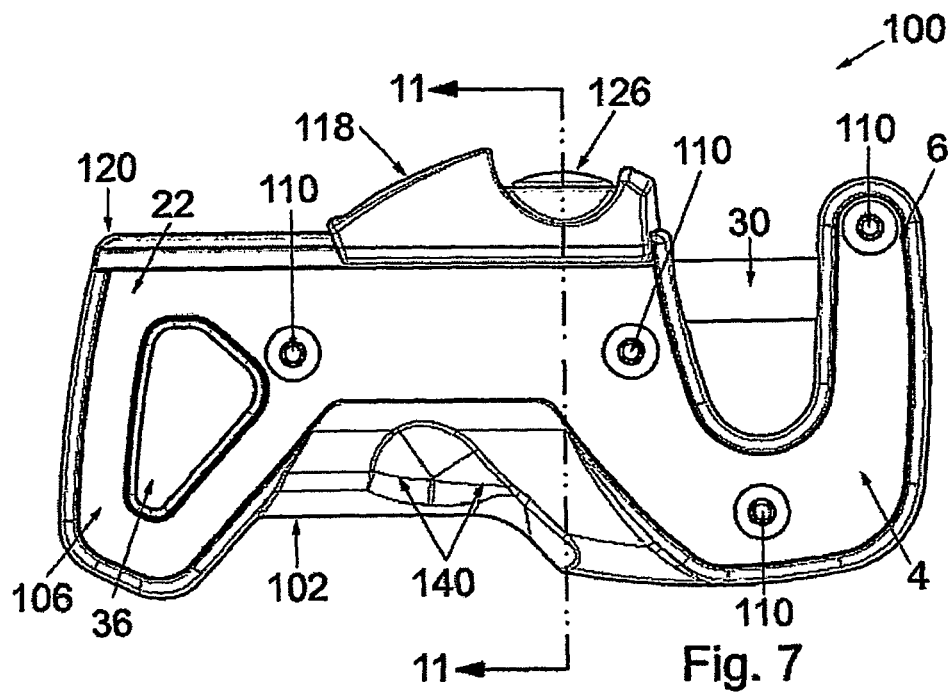
Fig. 7
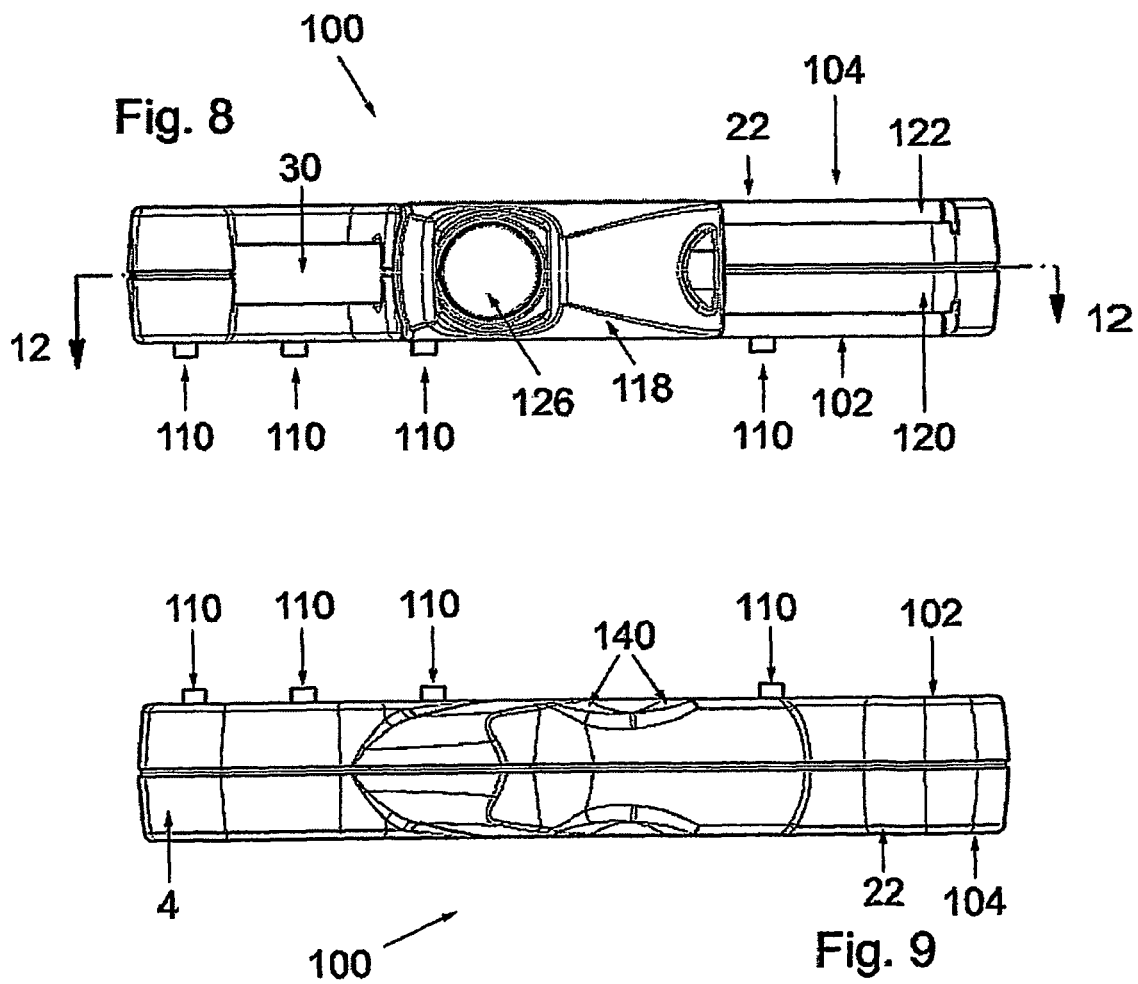
Fig. 8
Fig. 9

LOCKABLE COUPLING HOOK

This invention relates to a coupling member.

More particularly, the invention relates to a coupling member which includes a hook and a closure shaft which can be used for connecting to a loop or line. Typically, the coupling member could be used for securing lines in mountaineering, cave diving or other situations where a secure but releasable connection needs to be to a line or loop.

One known form of shackle has a hook at one end and a swivel connected eyelet at the other. A spring loaded shaft is provided to co-operate with the hook to form a closed loop. Normally the free end of the spring loaded shaft simply bears against the terminal part of the hook. This is not a particularly secure arrangement because the spring loaded hook could be inadvertently moved to its open position against the action of the spring. Also, when the shackle is used to couple to a line which is under tension, release of the shackle can be difficult because it is necessary to move the line over the end of the hook against the tension in the line. When the tension is high, this can make release of the shackle difficult, possibly leading to accidents.

The object of the present invention is to provide a novel coupling member which avoids at least some of the disadvantages of the prior art.

According to the present invention there is provided a coupling member including:

a body portion formed with a hook;

a closure shaft slidably mounted in a first axial direction in the body for movement between open and closed positions;

a locking member carried by the closure shaft and being movable between locked and unlocked positions, the arrangement being such that when the locking member is in its locked position, it prevents movement of the closure shaft from its closed position, and wherein the locking member includes a locking pin which is slidably mounted in the closure shaft, the pin having a head and wherein the body portion includes a slot or keyway, the arrangement being such that the locking pin needs to be moved to its unlocked position so that the pin can then move in the slot or keyway when the closure shaft moves;

an actuator which is mounted for sliding movement on the body in a second direction parallel to said first axial direction, the actuator having a recess in which the head of the locking pin is slidably mounted in a third direction which is transverse to said second direction; and a compression spring which biases the locking pin towards its locked position, the arrangement being such that the user, in use, presses the head inwardly relative to the actuator so that the locking pin moves in said third direction to its unlocked position so that the user can then slide the actuator in said second direction which moves the closure shaft in said first direction from its closed position to its open position.

Preferably, the locking member includes a locking pin which is slidably mounted in the closure shaft, the pin having a head and wherein the body portion includes a slot, the arrangement being such that the locking pin needs to be moved to its unlocked position so that the pin can move in the slot when the closure shaft moves.

Preferably, the hook has a terminal portion which is generally transverse to the direction of movement of the closure shaft.

Preferably further, the terminal portion includes a recess which receives a free end of the closure shaft in its closed position.

This arrangement has the advantage that there are no gaps between the free end of the closure shaft and the hook which can sometimes occur in known forms of shackle. Further, because the terminal portion of the hook is transverse to the direction of movement of the closure shaft, uncoupling of a line can be carried out by sliding the line over the terminal portion.

Preferably further, the closure shaft is biased towards its closed position.

Preferably the locking pin is biased towards its locked position.

Preferably, the closure shaft is biased towards its closed position by means of a compression spring. Preferably further, the compression spring acts between one end of the closure shaft and a screw which forms a swivel connection for an eyelet mounted on the body remote from the hook.

The invention also provides a coupling member including:

a body portion formed with a hook;

a closure shaft slidably mounted in a first axial direction in the body for movement between open and closed positions;

a locking member carried by the closure shaft and being movable between locked and unlocked positions, the arrangement being such that when the locking member is in its locked position, it prevents movement of the closure shaft from its closed position, and wherein the locking member includes a locking pin which is slidably mounted in the closure shaft, the pin having a head and wherein the body portion includes a slot or keyway, the arrangement being such that the locking pin needs to be moved to its unlocked position so that the pin can then move in the slot or keyway when the closure shaft moves;

an actuator which is mounted for sliding movement on the body in a second direction parallel to said first axial direction, the actuator having a recess in which the head of the locking pin is slidably mounted in a third direction which is transverse to said second direction; and wherein the body portion includes first and second complementary molded body parts, wherein the complementary body parts are formed with first projections which cooperate with second projections formed on the actuator to define a key and keyway for constraining the actuator to sliding movement relative to the body portion in said second direction.

The invention will now be further described with reference to the accompanying drawings, in which:

FIG. 2 is a longitudinal cross-section through one form of coupling member of the invention in a locked position;

FIG. 3 is a longitudinal cross-section through the coupling member in an open position;

FIG. 4 is a plan view of the coupling member with the sleeve removed;

FIG. 5 is a transverse cross-section along the line 5-5;

FIG. 6 is an exploded view of a preferred form of coupling member of the invention;

FIG. 7 is a side view of the coupling member;

FIG. 8 is a plan view of the coupling member;

FIG. 9 is an underside view of the coupling member;

Figure 1:
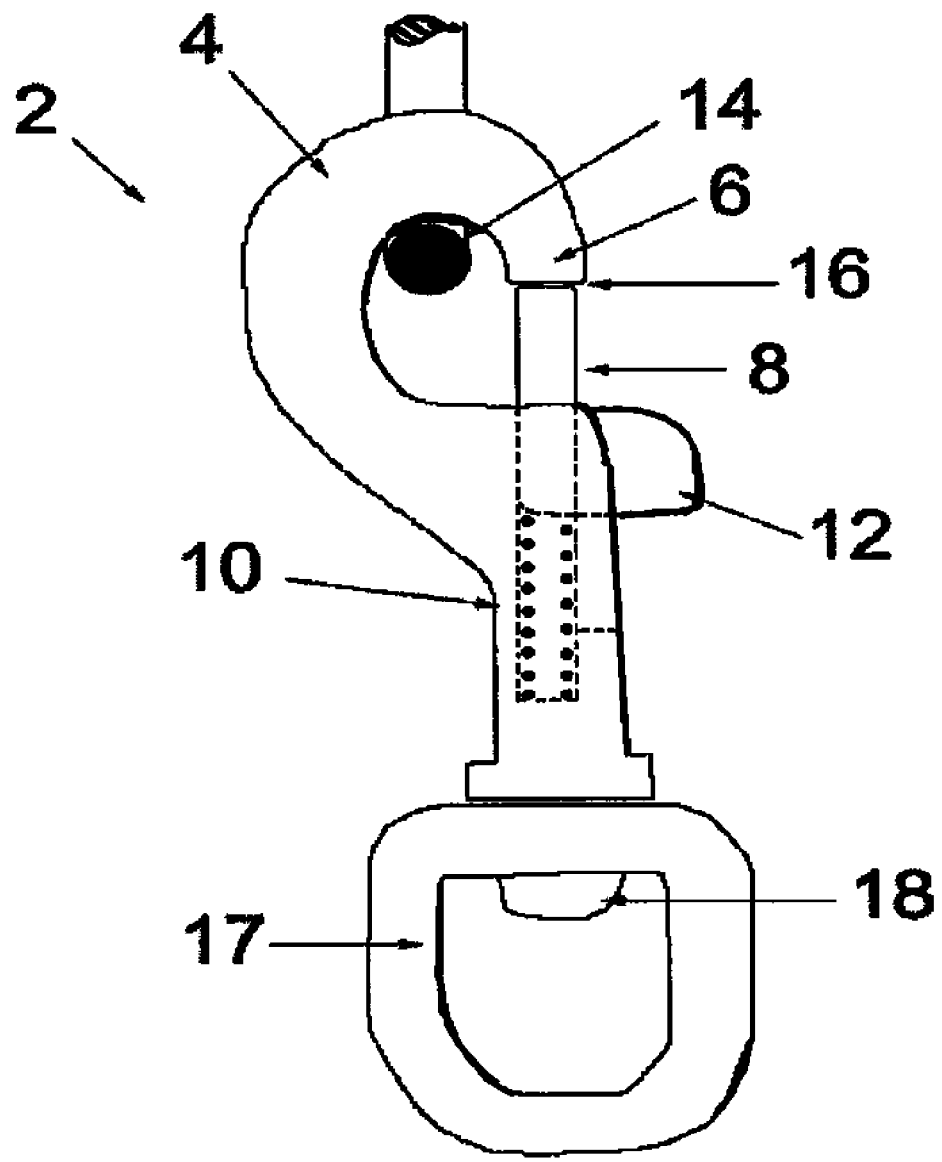
FIG. 1 is a fragmentary view of a known form of shackle.

FIG. 1 shows a known form of shackle 2. The shackle includes a hook portion 4 having a terminal portion 6. The shackle includes a spring loaded closure shaft 8 which is mounted in a body part 10 of the shackle. The shaft 8 can be moved by means of a tab 12 which is movable in a slot (not shown) in the body part 10. In the closed position shown in FIG. 1, the hook 4 co-operates with the closure shaft 8 to form a closed loop for coupling to a line 14. This type of shackle has disadvantages which can cause serious problems in some applications, such as mountaineering and/or cave diving and the like. First, there is sometimes a gap 16 between the free end of the locking shaft 8 and the terminal portion 6 of the hook. If the shackle and/or line are moved laterally the line may cause displacement of the shaft and inadvertent decoupling of the line. Another disadvantage is that when the line 14 is under tension, it needs to be moved against the tensile force, i.e. in the direction of the body 10, in order that it can clear the terminal portion 6 of the hook. This can be very difficult where the tensile forces are high. The shackle 2 normally has an eyelet 17 which is permanently coupled to the body part 10 by means of a rivet 18. This reduces the flexibility of the shackle because sometimes an open hook rather than an eyelet may be required at the other end of the shackle.

FIGS. 2 to 5 show one form of coupling member 20 of the invention. The coupling member includes a cylindrical body 22 which is formed with a hook 24 having a terminal portion 26. The body 22 includes a cylindrical bore 28 within which is mounted a closure shaft 30 having an outer end 32 and an inner end 34. The coupling member 20 includes an eyelet 36 which is connected to the body 22 by means of a screw 38 which is received within a threaded end 40 of the bore 28. The screw 38 permits the eyelet 36 to rotate or swivel, in the usual way. A compression spring 42 is located within the bore and acts between the inner end 34 of the shaft and the inner end of the screw 38. The spring 42 biases the shaft 30 towards the terminal portion 26 of the hook. The terminal portion 26 of the hook includes a recess 44 which receives the outer end 32 of the shaft 30 when in the closed position, as shown in FIG. 2. This forms a very secure connection between the free end of the shaft 30 and the hook 24.

The coupling member 20 includes a locking pin 50 having a head 52 at one end and threads at the other. A dome nut 54 is mounted on the threaded end of the pin 50. The pin 50 is slidably mounted in a transverse bore 56 which extends through the shaft 30. A compression spring 58 is mounted on the pin 50 and acts between the nut 54 and the shaft 30 and operates to bias the head 52 of the pin towards the shaft 30. It will be appreciated that the pin 50 is movable with the shaft 30 and in order to accommodate this movement, the body 22 is provided with upper and lower slots 60 and 62.

The head 52 of the pin includes a frustoconical portion 64. The frustoconical portion 64 is seated within a countersunk hole 66 which is formed at the end of the upper slot 60 adjacent to the hook 24, as best seen in FIGS. 2 and 5. When the pin 50 is in its locked position, as shown in FIG. 1, the head 52 is seated within the hole 66 and this prevents movement of the pin 50 in the slots 60 and 62 because the frustoconical portion 64 is wider than the width of the slots 60 and 62. This correspondingly prevents movement of the shaft 30 out of its locked position as shown in FIG. 2.

The coupling member 20 includes a sleeve 70 which has an internal bore 72 enabling it to slide over the cylindrical outer surface of the body 22. The sleeve includes a first bore 74 to enable the head 52 of the pin to pass therethrough and a second bore 76 to enable the dome nut 54 to pass therethrough. Adjacent to the bore 76 are gripping projections 78 and 80 which are preferably formed with ribbed surfaces, as shown for enabling a user to obtain a good purchase thereon.

FIG. 2 shows the coupling member 20 in a closed position. It will be seen that the dome nut 54 does not extend beyond the projections 78 and 80. This minimises the possibility of inadvertent contact being made with the dome nut 54 which might cause movement of the locking pin 50 to its unlocked position. When the user wishes to release the coupling member, his or her finger is pressed against the dome nut 54 so as to push it inwardly. This elevates the head 52 out of the countersunk hole 66. The user can then slide the sleeve 70 in a direction away from the hook 24. The pin 50 will move in the slots 60 and 62 and the shaft 30 will be carried with the pin to its open position, as shown in FIG. 3. Upon release of the sleeve 70, the compression spring 42 will act to return the shaft 30 to its closed position and the spring 58 will cause the pin 50 to return to its locked position, as shown in FIG. 1. In the illustrated arrangement, the coupling member includes an eyelet 36 but it is to be understood that other components could be connected to the body or alternatively the body 22 could be integrally formed with a fixed eyelet. In a still further modification, the eyelet 36 could be replaced by a component which was a duplicate of the body 22 so that it effectively constituted a double ended securely closing coupling member.

The coupling member of the invention can be made in various sizes, say having an overall length in the range from 60 mm to 200 mm. In the preferred arrangement, the length is about 124 mm. The diameter of the shaft 30 can be in the range from say 3 mm to 10 mm and preferably is 5 mm in diameter. The depth of the recess 44 can be in the range from 1.5 mm to 7 mm and is preferably about 3 mm.

The coupling member 20 can be made from materials suited to various applications. For maximum strength and security, it is preferred that the body 22 is made from titanium. Similarly, the shaft 30 and eyelet 36 can be made from titanium. The screw 38 and pin 50 can also be made of titanium but commercially available stainless steel components could be used for these parts. The sleeve 70 can be moulded from a durable plastics material such as ABS. Alternatively, the various components could be made from stainless steel, brass or other durable material.

FIGS. 6 to 12 illustrate a preferred form of coupling member 100 of the invention. In these drawings, the same reference numerals have been used to denote parts which are the same as or correspond to those of the embodiment of FIGS. 2, 3 and 4.

The main difference between the coupling member 100 and the coupling member 20 is that the body portion 22 is made up from a number of separate components which are fastened together. More particularly, the body portion 22 includes first and second moulded components 102 and 104 and first and second side plates 106 and 108. The moulded components 102 and 104 are preferably injection moulded from plastics material such as nylon or acetyl plastic. The side plates 106 and 108 are preferably formed from metal such as titanium or stainless steel. The components 102, 104, 106 and 108 are fastened together by means of four rivets 110 which pass through aligned holes 112 formed in the components 102, 104, 106 and 108.

The moulded components 102 and 104 are generally recessed on their outer sides so as to receive the side plates 106 and 108 therein. The moulded components 102 and 104 are also moulded with formations which define the cylindrical bore 28 in which the closure shaft 30 is slidably mounted. The components 102 and 104 are also formed with the transverse bore 56 in which the locking pin 50 is slidably mounted. In the illustrated arrangement, the components 102 and 104 are formed with shoulders 114 which define a stop against which the inner end of the compression spring 42 acts. The other end of the spring 42 is partially mounted over the inner end 34 of the shaft 30, the shaft 30 being provided with an annular shoulder 116 against which the outer end of the spring 42 acts. In the illustrated arrangement, the component 104 includes a recess 117 which gives access to the cylindrical bore 28 from the eyelet 17. This enables flushing of the bore 28 with water or compressed air to clear any foreign material from the bore 28 in which the compression spring 42 is located.

Figure 10:
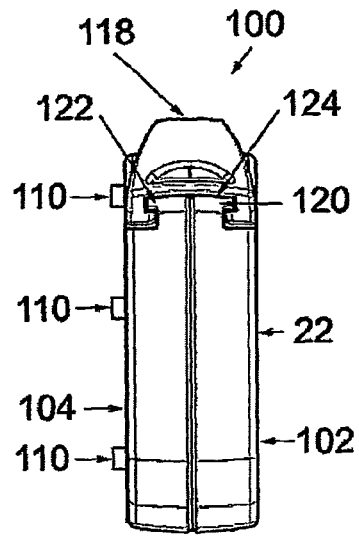
FIG. 10 is an end view of the coupling member.
Figure 11:
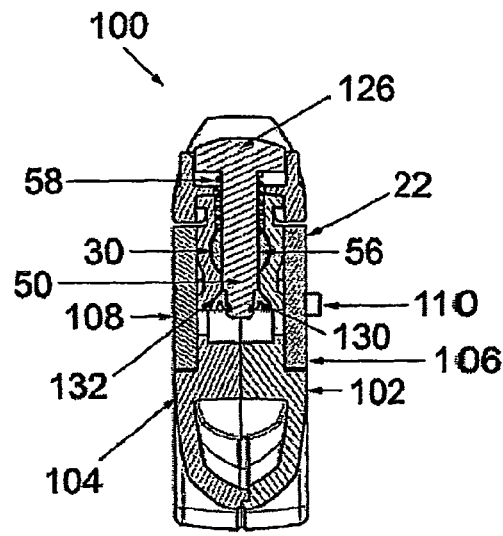
FIG. 11 is a cross-sectional view along the line 11-11.
Figure 12:
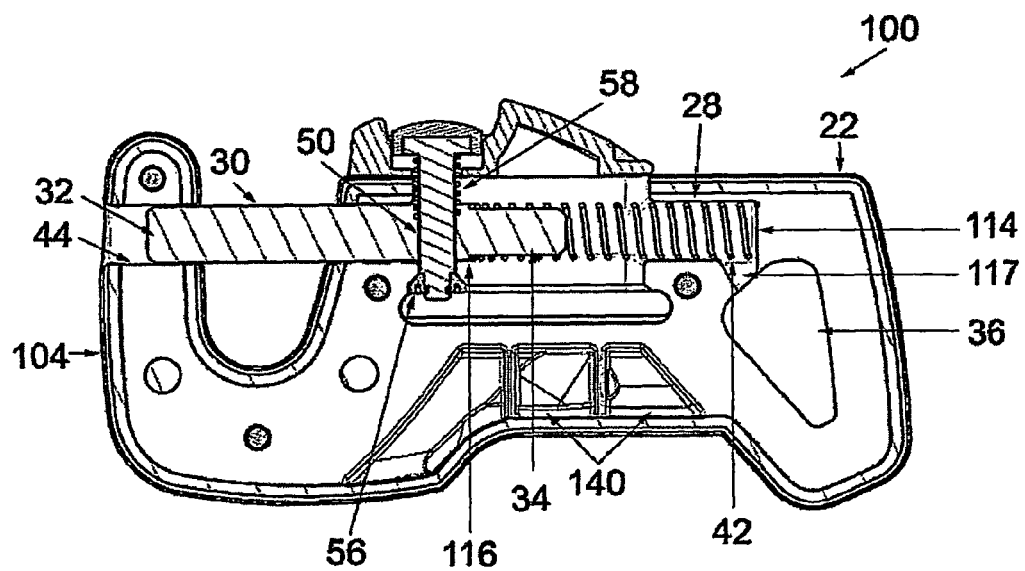
FIG. 12 is a cross-sectional view along the line 12-12.

In the illustrated arrangement, the sleeve 70 is replaced by a slide actuator 118 which is mounted for sliding movement on the moulded components 102 and 104. More particularly, the moulded components 102 and 104 are formed with lateral projections 120 and 122 and the underside of the actuator 112 is formed with a complementary keyway 124. As best seen in FIG. 10, the projections 120 and 122 are received within the keyway 124 and permit limited sliding movement of the actuator 112 relative to the body 22. The locking pin 50 includes a rounded head 126 which in use is located within a cylindrical recess 128 formed in the actuator 118. The lower end of the locking pin 50 has mounted thereon a frustoconical locking body 130. The pin 50 passes through the transverse bore 56 in the closure shaft 30, as in the previous embodiment, and the spring 58 acts between the underside of the head 126 and the closure shaft 30. The moulded components 102 and 104 are formed with concave recesses 132 which are complementary in shape to the locking body 130 so that in the locked position of the pin, as shown in FIG. 10, the locking member 130 is located within the concave recess 132. This prevents sliding movement of the actuator. When, however, the user wishes to open the coupling member, the user presses on the rounded head 126 in an inward direction so as to move the locking body 130 clear of the recess 132. The actuator can then be used to move the closure shaft 30 towards the left, as shown in FIG. 11 so that its outer end 32 will clear the recess 44. In the illustrated arrangement the recess 44 is in the form of a bore which extends through the terminal portion 26 of the hook. This arrangement assists in preventing clogging of the recess with dirt or other foreign material. This enables the coupling to be connected or disconnected to a line 14, as described previously. The moulded components 102 and 104 being moulded from plastics material are light weight, relatively cheap to manufacture and can be shaped so as to provide a convenient and eye pleasing appearance. For instance in the illustrated arrangement, the components 102 and 104 are formed with shallow grooves 140 which assist manual gripping of the coupling member.

As mentioned above, the use of multiple components for making the body 22 enables flexibility in the use of materials. For instance, the moulded components 102 and 104 can be moulded from a variety of plastics materials. The side plates 106 and 108 can be cast or fabricated from suitable metals or alloys. The rivets 110 are conveniently formed from stainless steel. The actuator 118 is preferably moulded from plastics material such as nylon or acetyl plastic. The locking pin 50 can be formed from stainless steel or moulded from a hard plastic material such as ABS or the like.

Many modifications will be apparent to those skilled in the art without departing from the spirit and scope of the invention.

The invention claimed is:

1. A coupling member including:
   a body portion formed with a hook;
   a closure shaft slidably mounted in a first axial direction in the body for movement between open and closed positions;
   a locking member carried by the closure shaft and being movable between locked and unlocked positions, the arrangement being such that when the locking member is in its locked position, it prevents movement of the closure shaft from its closed position, and wherein the locking member includes a locking pin which is slidably mounted in the closure shaft, the pin having a head and wherein the body portion includes a slot or keyway, the arrangement being such that the locking pin needs to be moved to its unlocked position so that the pin can then move in the slot or keyway when the closure shaft moves;
   an actuator which is mounted for sliding movement on the body in a second direction parallel to said first axial direction, the actuator having a recess in which the head of the locking pin is slidably mounted in a third direction which is transverse to said second direction; and
   a compression spring which biases the locking pin towards its locked position, the arrangement being such that the user, in use, presses the head inwardly relative to the actuator so that the locking pin moves in said third direction to its unlocked position so that the user can then slide the actuator in said second direction which moves the closure shaft in said first direction from its closed position to its open position.

2. A coupling member as claimed in claim 1 wherein the hook has a terminal portion which is generally transverse to the direction of movement of the closure shaft.

3. A coupling member as claimed in claim 2 wherein the terminal portion includes a recess which receives a free end of the closure shaft in its closed position.

4. A coupling member as claimed in claim 3 wherein the recess is a blind recess.

5. A coupling member as claimed in claim 3 wherein the recess is in the form of a bore which passes through the terminal portion.

6. A coupling member as claimed in claim 3 wherein the closure shaft is biased towards its closed position.

7. A coupling member as claimed in claim 6 wherein the closure shaft is biased towards its closed position by means of a compression spring.

8. A coupling member as claimed in claim 1 wherein the locking pin is biased towards its locked position.

9. A coupling member as claimed in claim 1 wherein an inner end of the locking pin includes a locking projection which is seated in a locking recess formed in the body portion when the locking pin is in its locked position and wherein the locking projection is clear of said locking recess when the locking pin is in its unlocked position.

10. A coupling member including:
    a body portion formed with a hook;
    a closure shaft slidably mounted in a first axial direction in the body for movement between open and closed positions;
    a locking member carried by the closure shaft and being movable between locked and unlocked positions, the arrangement being such that when the locking member is in its locked position, it prevents movement of the closure shaft from its closed position, and wherein the locking member includes a locking pin which is slidably mounted in the closure shaft, the pin having a head and wherein the body portion includes a slot or keyway, the arrangement being such that the locking pin needs to be moved to its unlocked position so that the pin can then move in the slot or keyway when the closure shaft moves;
    an actuator which is mounted for sliding movement on the body in a second direction parallel to said first axial direction, the actuator having a recess in which the head of the locking pin is slidably mounted in a third direction which is transverse to said second direction; and
    wherein the body portion includes first and second complementary moulded body parts, wherein the complementary body parts are formed with first projections which cooperate with second projections formed on the actuator to define a key and keyway for constraining the actuator to sliding movement relative to the body portion in said second direction.

11. A coupling member as claimed in claim 10 wherein the body portion includes first and second side plates which are disposed laterally relative to said first and second moulded body parts.

12. A coupling member as claimed in claim 11 wherein the means for fixing the components together include a plurality of rivets which extend between the side plates and clamp the moulded body parts therebetween.

13. A coupling member as claimed in claim 11 wherein the moulded body parts are injection moulded from plastics material and the side plates are metallic.

* * * * *